US007386929B2

(12) United States Patent
Gibbs

(10) Patent No.: US 7,386,929 B2
(45) Date of Patent: Jun. 17, 2008

(54) METHOD OF MANUFACTURE COATED WOOD ARTICLES

(75) Inventor: Barrie D. Gibbs, Pittsburgh, PA (US)

(73) Assignee: Gibbs Group Holdings, Inc., Pittsburgh, PA (US)

( * ) Notice: Subject to any disclaimer, the term of this patent is extended or adjusted under 35 U.S.C. 154(b) by 448 days.

(21) Appl. No.: 10/970,924

(22) Filed: Oct. 22, 2004

(65) Prior Publication Data

US 2005/0087618 A1 Apr. 28, 2005

Related U.S. Application Data

(60) Provisional application No. 60/515,245, filed on Oct. 28, 2003.

(51) Int. Cl.
*B23P 19/04* (2006.01)
*E01B 3/00* (2006.01)

(52) U.S. Cl. .......................................... 29/460; 238/29

(58) Field of Classification Search .................. 29/460, 29/894, 428, 897, 897.35; 238/29, 83, 84, 238/85, 95, 118; 264/149, 171.11, 211.24
See application file for complete search history.

(56) References Cited

U.S. PATENT DOCUMENTS

| | | | | |
|---|---|---|---|---|
| 952,977 | A | 3/1910 | Case | |
| 1,036,860 | A | 8/1912 | Kull | |
| 1,041,736 | A | 10/1912 | Caldwell | |
| 1,623,185 | A | 4/1927 | Hinde | |
| 4,083,491 | A * | 4/1978 | Hill | 238/98 |
| 5,916,932 | A | 6/1999 | Nosker et al. | |
| 6,336,265 | B1 | 1/2002 | Niedermair | |

* cited by examiner

*Primary Examiner*—John C. Hong
(74) *Attorney, Agent, or Firm*—James R. Williams

(57) ABSTRACT

Coating adhesion on wooden articles, such as railroad crossties, is improved through use of three surface-treating techniques prior to application of the coating. The first technique involves forming grooves on the surface of the wooden article, the second technique involves exposing the wooden article to heat to reduce the moisture content of the surface of the wooden article, and the third technique involves creating incisions on the surface of the wooden article to further promote adhesion. The techniques may be advantageously used together to further enhance coating adhesion.

9 Claims, 2 Drawing Sheets

METHOD OF MANUFACTURE COATED WOOD ARTICLES

This patent application claims priority under 35 U.S.C. § 119(e) from provisional patent application Ser. No. 60/515,245, filed Oct. 28, 2003, entitled IMPROVED ADHESION OF A COMPOSITE RAILROAD TIE BY GROOVING AND CASE HARDENING PRIOR TO ENCAPSULATION.

The present invention is directed to the surface treatment of wooden articles, such as railroad crossties, that enhances the adhesion of wooden articles to subsequently applied resinous coatings and to products manufactured thereby.

BACKGROUND OF THE INVENTION

The present invention pertains to several techniques for improving coating adhesion to wooden articles, such as railroad crossties, pilings, boat docks, decks, porch and patio flooring, fences, telephone poles, and many other wooden articles of various cross sections.

The present invention is particularly directed to improving coating adhesion for railroad crossties that are coated by a continuous process involving the passage of a series of wooden members, having end caps, in a substantially end-to-end configuration through a crosshead extrusion die. Such process extrudes resinous molten extrudate from a distribution passage into the die opening and around the side surfaces of the wooden member so as to form a coating on the side surfaces.

Various types of railroad crossties are known in the art. Examples of such railroads crossties are shown in U.S. Pat. Nos. 952,977; 1,036,860; 1,041,736; 1,623,158; and 5,916,932.

The useful life of railroad crossties has been extended by coating a wooden core member with a resinous coating and by placing end caps over the ends of the core member. Such technique is described in U.S. Pat. No. 6,336,265, granted to Niedermair on Jan. 8, 2002. This patent describes a composite railroad crosstie for supporting railroad track rails on a ballast or concrete roadbed. The crosstie comprises a wooden core of virgin or recycle natural wood or of man-made, engineered wood such as oriented strand board (OSB), plywood, and the like. The wooden core is coated with virgin or recycled thermoplastic resins, thermosetting resins, and/or rubber. Fillers or reinforcements may optionally be included. During manufacture, the core member is sized to a dimension less than the desired dimension of the finished crosstie to provide space for the coating. End caps are positioned over the ends of the core member and then a resinous coating is applied to the core member in a continuous process by passing a series of core members, containing end caps, in a substantially end-to-end configuration through a cross head die.

Although the above-described composite crosstie constitutes an improvement over uncoated wooden crossties, problems in coating separation from the core member have been encountered. Such separation serves to reduce the useful life of the railroad crosstie because the beneficial effect of the protective coating is minimized, or even lost. The present invention addresses this problem in the art by treating the surface of the core member prior to coating to substantially improve coating adhesion and thereby achieve a crosstie having an extended useful life. Surface treatments include placing grooves on the surface of the core member and/or driving off moisture from the surface of the core member and/or incising prior to coating the surface of the core member. When used in combination, grooving and incision are normally performed prior to driving off moisture from the surface of the core member, followed by subsequent coating. These techniques serve to significantly improve adhesion between the wooden crosstie and its coating.

SUMMARY OF THE INVENTION

The present invention is directed to improved resinous-coated wooden articles, such as resinous-coated railroad crossties, and to methods for making such wooden articles. One such method for making coated wooden articles having improved coating adhesion involves providing an elongated wooden member having a surface area; and then treating at least a portion of the surface area of the wooden member to enhance adhesion and consequent resistance to separation of a subsequently-applied resinous coating; and then coating at least a portion of the surface area of the wooden member with a resinous coating to produce a coated article resistant to separation of the wooden member and the resinous coating.

Another type of treatment for making wooden articles, such as coated railroad crossties, having improved coating adhesion involves forming at least one groove on the surface of the wooden member prior to coating to enhance adhesion of the wooden member and coating.

Another type of treatment for making wooden articles, such as coated railroad crossties, having improved coating adhesion involves heating the surface of the wooden member at a sufficient temperature and for a sufficient time to drive off a large portion of the moisture from the surface of said wooden member prior to the coating step.

Another type of treatment for making wooden articles, such as coated railroad crossties, having improved coating adhesion involves forming incisions on the surface of the wooden member prior to coating to enhance adhesion of the wooden member and coating.

The three types of treatments described above may be advantageously used in combination to achieve optimal adhesion.

The resultant product of one of the above-described treatments is a coated wooden article, such as a railroad crosstie, having improved coating adhesion comprising an elongated wooden member having at least one groove on the surface of the wooden member.

The resultant product of another of the above-described treatments is a coated railroad crosstie having improved coating adhesion comprising an elongated wooden member having a surface area containing less moisture than normally occurring in the wooden member.

The resultant product of another of the above-described treatments is a coated railroad crosstie having improved coating adhesion comprising an elongated wooden member having a surface area containing incisions in the wooden member.

Optimum processes and products involve the combination of features of each of the above-described processes and wooden articles.

DETAILED DESCRIPTION OF THE INVENTION

Figure 1:
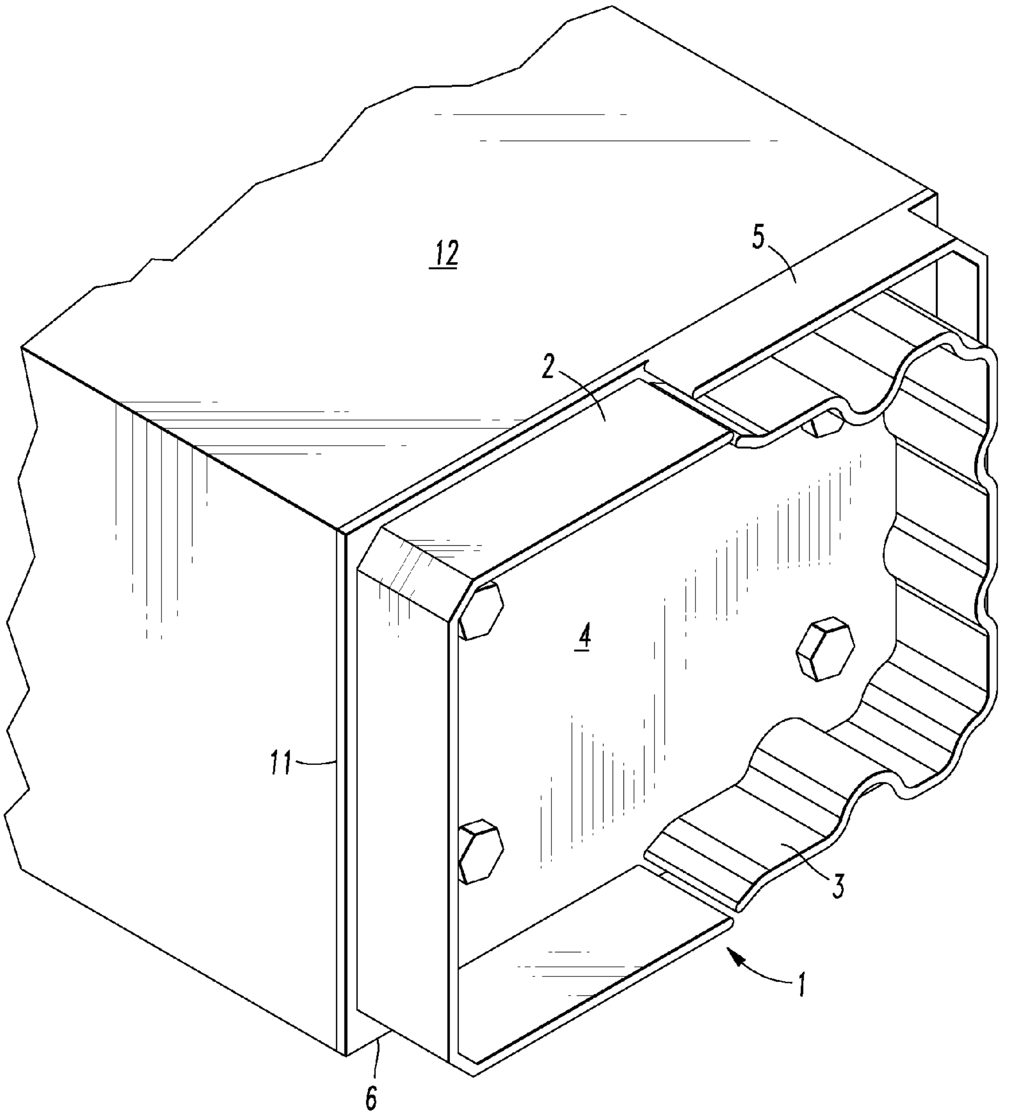
FIG. 1 shows a perspective view of an end cap of the present invention fixed to a railroad tie.
Figure 2:
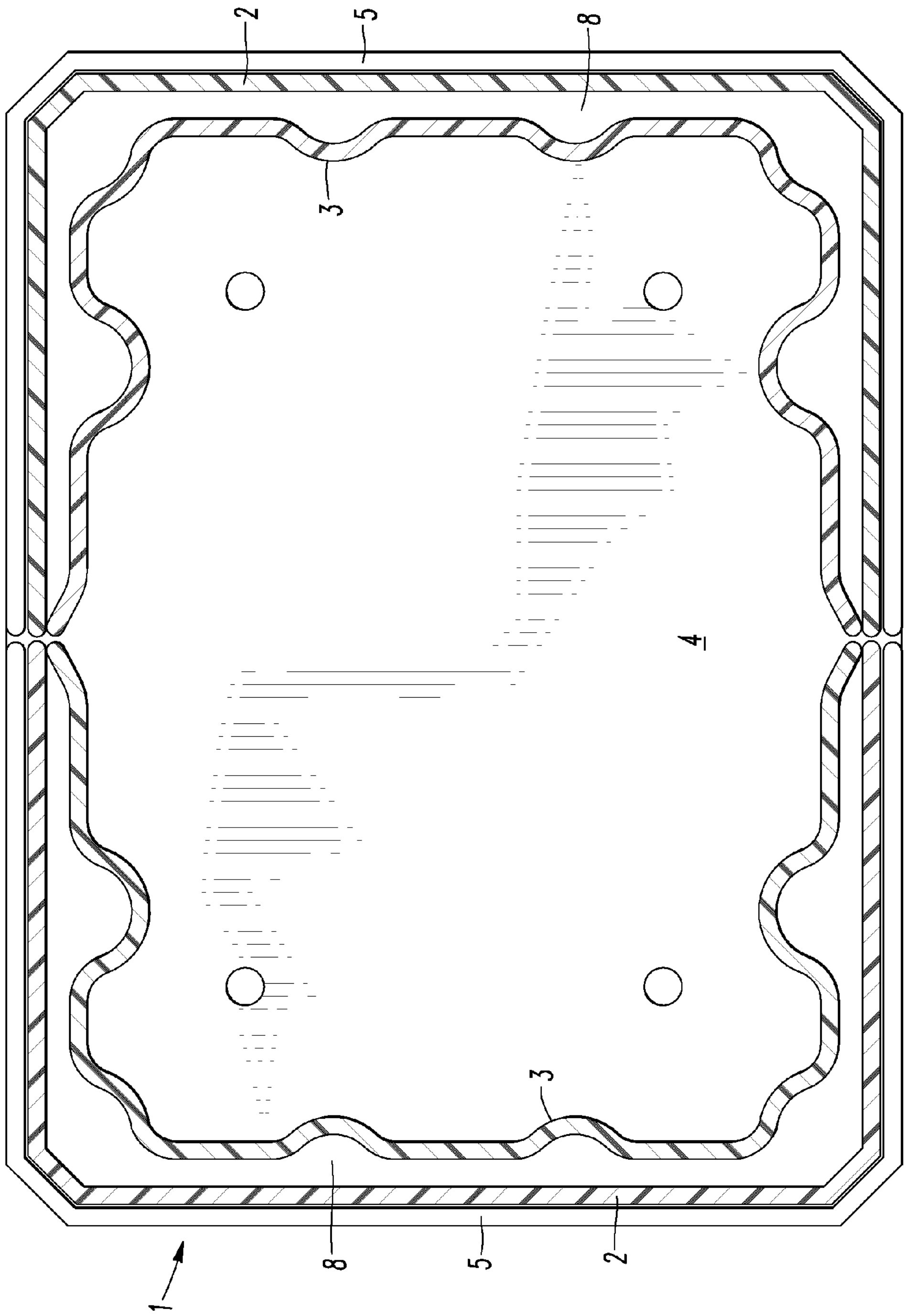
FIG. 2 shows a cross-section of a joint between two adjacent end caps during an assembly process.

Although the present invention is applicable to improved coating adhesion for a number of wooden articles, such as a coated railroad crosstie, the following description is set forth in terms of the treatment of wooden railroad crossties. One skilled in the art will have no difficulty in applying the following description to make and use other types of wooden articles.

Adhesion of resinous coatings to the surface of railroad crossties is improved by the techniques of the present invention, either separately or in combination thereof. The use of these techniques together provides a greater amount of adhesion than that obtained through use of only one of the techniques.

The first technique involves forming at least one groove on the surface of an elongated wooden crosstie prior to applying a resinous coating to the surface of the grooved crosstie. Groove(s) are preferentially formed along a longitudinal surface(s) of the crosstie. However, grooves placed parallel to the longitudinal surface would function to enhance locking of the coating to the surface of the wooden crosstie. A combination of the above-discussed groove orientations is contemplated. Also contemplated is the placement of grooves at various other angular orientations.

When a rectangular shaped wooden crosstie is utilized, grooves may be placed on one or more of the four sides of the crosstie. It is preferred to utilize at least one groove on each of the four sides to maximize enhancement of locking of the coating to the surface of the wooden crosstie.

Groove shapes may include dovetail, square, triangle, truncated triangle, or any other desired shape. A dovetail shape is preferred because the different cross sections of this shape serve to enhance locking of the coating to the crosstie. Dovetail shaped grooves involve a smaller area at the surface of the wooden crosstie and a larger area at the interior of the wooden crosstie. Similarly, triangle or truncated triangle shaped grooves wherein one tip or surface of the triangle or truncated triangle groove is located at the surface and the larger area located in the interior of the wooden crosstie may be utilized to further enhance locking.

For example, a longitudinal dovetail groove 3/16 inch at its bottom and 1/8 inch at its top may be utilized. Alternatively, a longitudinal square groove having dimensions of 1/8 inch deep by 1/8 inch wide may be used.

The grooves may be formed on the wooden crosstie by conventional means including hand or machine routing. In particular, a multi-head routing machine with brushes and vacuum to remove wood particles is suitable to form the above-mentioned grooves.

A second technique involves a reduction in (including the essential removal of) moisture from the surface of the wooden crosstie prior to application of the coating. Such reduction results in excellent binding of the coating to the wooden crosstie and thereby minimizes subsequent delamination or separation of the coating. The wood crosstie surface is heated in a conventional heating apparatus, such as a furnace, oven, heater, or the like, for sufficient time and at a temperature to drive off a large portion of the moisture from the surface of the wooden crosstie. Continuous passage of the crosstie through a heating apparatus is preferred because such technique is efficient. It is preferred to drive off essentially all moisture from the surface to maximize adhesion. Oftentimes, the heating will result in a release of moisture in the form of steam from the heated surface, may cause combustion of small portions, such as splinters, of the wooden crosstie, and cause charring of the surface. Typically, heating temperatures in the atmosphere of the furnace or oven of about 800° to about 1,200° F. are sufficient to expel a desired amount of moisture from the surface of the wooden crosstie. Typical heating times ranging from about 1 to about 20 minutes may be utilized, although less than 1 minute or more than 20 minutes may be utilized, depending on the size of the wooden crosstie and travel speed. As would be appreciated by one skilled in the art, the above stated temperatures and times may be further varied when wooden materials having various moisture contents are being treated. Upon exposure to the heated atmosphere of the furnace or oven, the actual surface temperature of the wood is lower than that of the atmosphere but is sufficient to reduce or essentially eliminate the moisture content of the surface of the wood. It is preferred to reduce the moisture content as low as possible to enhance adhesion of the coating to the wooden crosstie.

It is preferred to obtain an essentially moisture-free surface. The essentially moisture free surface of the wooden crosstie may be characterized as a "case hardened surface." Such term means that the surface and a shallow depth of the wood have been heated to an extent that such area is essentially moisture free. This case hardened area serves as a seal to prevent moisture from passing from the interior of the wood to its surface to interfere with the bond of the coating and the wooden crosstie, thereby preventing subsequent delamination or separation.

An example of a suitable heating technique is passing the uncoated wooden crosstie through four gas fired infrared heaters, which produce a total of 200,000 BTU's. Such exposure removes essentially all moisture from the surface of the wood and creates a slight charcoaled appearance on the surface.

Exposure for different times and different BTU producing heaters that equal 600,000 BTU's is contemplated, and one skilled in the art would routinely determine specific combinations. For example, 300,000 BTU's could be applied over a one and one-half minute time period. Obviously, exposure times may be increased or decreased dependent upon BTU capacity of the heater. It is contemplated that exposure of from about 200,000 to about 800,000 BTU's may be utilized. Exposure to less than about 200,000 BTU's and exposure above about 800,000 BTU's is not economical.

A third treatment involves making incisions in the surface of the wooden crosstie prior to coating the wooden crosstie. Such incision or opening subsequently becomes at least partially filled with resinous coating material to further enhance adhesion. Incising may be performed prior to and/or after grooving and prior to heating to drive off moisture from the surface of the wood. A knife or other sharp object may be exerted against or otherwise forced into the wood to make the incision. However, it is preferred to use a roller having knife-like projections to incise the surface of the wood.

Wooden articles, such as wooden crossties, may comprise a variety of materials. For example, the wood may be new or virgin, recycled, or engineered. The wooden crosstie may also be formed from hardwood, softwood, or from man-made wood, such as plywood, oriented strand board (OSB), composite plastic profiles (known as plastic lumber), and the like. The wood may be in a green or dried condition.

A wide variety of wooden article cross sections, including but not limited to, square, rectangle, triangle, octagon, diamond, etc. may be treated and coated with use of the invention.

Coating of the treated wooden crosstie with a resinous coating material may be accomplished by a variety of techniques. Suitable resinous coating materials include thermosetting resins (such as epoxies, polyesters, epoxy-polyester hybrids, acrylates, and the like), thermoplastic resins, as well as rubbers. Suitable coating thicknesses are generally on the order of from about 1 to about 10 mils, but may vary, depending upon the specific application.

No specific coating technique is essential to achieving the general desired result of the invention, i.e., improving the adhesion of a coating to a wooden crosstie, thereby extending the useful life of the coated crosstie. For example, the resinous coating may be applied to the treated wooden crosstie as a liquid or as a powder by conventional, known means.

It is contemplated that the general coating method set forth in U.S. Pat. No. 6,336,265 may be advantageously employed in connection with the present invention when producing resinous-coated railroad crossties. Such method includes positioning end caps over the ends of the wooden crossties prior to coating and is also contemplated by the present invention. The coating method of U.S. Pat. No. 6,336,265 involves the continuous passage of a series of wooden crossties with end caps in a substantially end-to-end configuration through a crosshead die to effect coating. Such process extrudes molten resinous extrudate from a distribution passage into the die opening and around the side surfaces of the wooden member to form a coating thereon.

The end caps depicted in U.S. Pat. No. 6,336,265 are secured against the end of the railroad crosstie. Securing is accomplished by placing leg-like members of the end cap into slots created in the respective crosstie ends. The outer or exposed surface of the end cap is depicted as being flat. When railroad crossties are continuously passed end-to-end through a coating apparatus, they tend to fuse together due to heat from the coating process, and they become difficult to separate by cutting, sawing, or the like. The present invention addresses such problem by use of a different end cap outer surface design.

As shown in FIGS. a1 and 2, the present invention may use end caps 1 that fit into the end 11 of the wooden crosstie 12 in a similar fashion as described in U.S. Pat. No. 6,336,265. However, rather than having a flat outer surface 4, the end caps 1 of the invention have at least two concentric, lip-like projections 2, 3 on about one-half of the outer surface 4. The end cap 1 also preferably has a ridge 5 located proximate to the periphery 6 of the outer surface 4 (away from the wood) to permit orientation and indexing of the lips 2, 3 with the opposing end cap when end-to-end railroad crossties are passed through the coating process. Such ridge 5 extends for about half of the periphery 6 and does not extend into the area of the lip 2, 3. Such structural relationship permits and facilitates indexing. Permitting such outer lips 2 or projections to soften during heating prior to coating obtains excellent adhesion of the molten coating while protecting the inner lip 3 from softening. This prevents the lips 2, 3 from collapsing against each other. This type of end cap 1 facilitates subsequent cutting apart of crossties 12 made in a continuous process. When end-to-end coating is performed, it is preferred to orient the lip-like projections 2, 3 or each of the consecutive crossties 12 to promote nesting. In this manner, the respective two concentric, lip-like projections 2, 3 that are located on about one-half of the respective outer portion of the end caps nest and thereby form a hollow space 8 between the lips. The hollow space 8 is much more readily separated than the fused solid end caps of U.S. Pat. No. 6,336,265.

I claim:

1. In the method of coating an elongated wooden railroad crosstie with a resinous coating comprising securing end caps on ends of said elongated wooden railroad crosstie, passing a series of elongated wooden railroad crossties having end caps in substantially end-to-end configuration through a crosshead die opening and contacting said elongated wooden railroad crossties with a molten resinous extrudate in said die opening to form a coating on a surface of said elongated wooden railroad crossties to form resinous elongated wooden coated railroad crossties having end caps, and separating said elongated wooden coated railroad crossties, the improvement comprising securing end caps having an outer surface opposite to an end cap surface in contact with said coated elongated wooden railroad crosstie, said outer end cap surface having at least two concentric lip-like projections on about one-half of said end cap outer surface and having a ridge located proximate to the periphery of said end cap and not extending into an area occupied by said lip-like projections, whereby separation of said elongated wooden coated railroad crossties after coating is facilitated.

2. The method of claim 1, further comprising treating the surface of the elongated wooden railroad crosstie to enhance adhesion of the molten resinous extrudate before contacting the elongated wooden railroad crosstie with the molten resinous extrudate.

3. The method of claim 2, wherein treating comprises heating the elongated wooden railroad crosstie at a sufficient temperature and for a sufficient time to drive off a large portion of moisture from the surface.

4. The method of claim 3, wherein heating comprises exposing the surface to a temperature from about 800° F. to about 1200° F. for about 1 minute to about 20 minutes.

5. The method of claim 3, wherein heating comprises exposing the surface to from about 200,000 BTU's to about 800,000 BTU's.

6. The method of claim 2, wherein treating the surface comprises forming at least one groove on the surface.

7. The method of claim 6, wherein the groove has a shape selected from a group consisting of dovetail, square, rectangular, and combinations thereof.

8. The method of claim 2, wherein treating the surface includes forming at least one incision on the surface.

9. A resinous coated wooden railroad crosstie comprising an elongated wooden member having ends and having a resinous surface coating and end caps secured on said ends of said member, said end caps having an outer surface opposite to an end cap surface in contact with said coated wooden railroad crosstie, said outer end cap surface having at least two concentric lip-like projections on about one- half of said end cap outer surface and having a ridge located proximate to the periphery of said end cap and not extending into an area occupied by said lip-like projections.

* * * * *